United States Patent
McMullen et al.

(10) Patent No.: US 9,924,449 B1
(45) Date of Patent: *Mar. 20, 2018

(54) METHODS AND SYSTEMS FOR CONTROLLING IMPLEMENTATION OF A LOCATION-BASED SERVICE FOR A WIRELESS COMMUNICATION DEVICE

(71) Applicant: Sprint Spectrum L.P., Overland Park, KS (US)

(72) Inventors: Michael P. McMullen, Leawood, KS (US); Roger D. Bartlett, Merriam, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/686,035

(22) Filed: Apr. 14, 2015

(51) Int. Cl.
*H04W 4/02* (2009.01)
*H04W 48/16* (2009.01)
*H04W 4/22* (2009.01)

(52) U.S. Cl.
CPC .......... *H04W 48/16* (2013.01); *H04W 4/22* (2013.01)

(58) Field of Classification Search
CPC ....... H04W 4/02; H04W 4/025; H04W 84/12; H04W 4/04; H04W 4/22; H04W 4/008; H04W 64/003
USPC ...................................... 455/456.3
See application file for complete search history.

(56) References Cited

U.S. PATENT DOCUMENTS

| | | | |
|---|---|---|---|
| 7,245,900 B1 | 7/2007 | Lamb | |
| 7,433,673 B1 | 10/2008 | Everson | |
| 7,602,886 B1 | 10/2009 | Beech | |
| 7,907,579 B2 | 3/2011 | FitzGerald | |
| 8,126,476 B2 * | 2/2012 | Vardi | H04W 72/02 455/422.1 |
| 8,265,068 B2 | 9/2012 | Olshanksy | |
| 8,289,958 B1 | 10/2012 | Narayanan | |
| 8,743,782 B1 * | 6/2014 | Patel | G01S 5/0242 370/328 |
| 8,805,403 B2 | 8/2014 | Curticapean | |
| 9,420,425 B1 * | 8/2016 | McMullen | H04W 4/025 |
| 2014/0171015 A1 | 6/2014 | Choi-Grogan | |

* cited by examiner

*Primary Examiner* — Lester Kincaid
*Assistant Examiner* — Dung Lam

(57) ABSTRACT

A wireless communication device (WCD) stores a location of a portable WAP and is configured to report the stored location of the portable WAP to a location-based service provider (LBSP) when the WCD is within coverage of the portable WAP and requests a location-based service from the LBSP. While the WCD is within coverage of the portable WAP, the WCD (i) uses a wireless-communication interface to detect that the WCD is also within one or more particular cellular coverage areas and (ii) stores a correlation between the portable WAP and the one or more particular cellular coverage areas. Thereafter, while the WCD is again within coverage of the portable WAP, the WCD determines that the WCD is not within coverage of the one or more particular cellular coverage areas. In response, the WCD reconfigures itself to not report the stored location of the portable WAP to the LBSP when the WCD requests the location-based service.

20 Claims, 4 Drawing Sheets

METHODS AND SYSTEMS FOR CONTROLLING IMPLEMENTATION OF A LOCATION-BASED SERVICE FOR A WIRELESS COMMUNICATION DEVICE

BACKGROUND

An example wireless network may include a wireless access point (WAP) that defines a wireless coverage area in which wireless communication devices (WCDs) such as cell phones, tablet computers, tracking devices, embedded wireless modules, and other wirelessly equipped communication devices, can operate. In turn, such a WAP may be coupled with network infrastructure that provides connectivity to a packet-switched network, such as the public switched telephone network (PSTN) and/or the Internet for instance. In practice, the WAP may assign an Internet Protocol (IP) address to the WCD to facilitate such wireless packet-data communication. With this arrangement, a WCD within coverage of the WAP may engage in air interface communication with the WAP and may thereby communicate via the WAP with various remote network entities or with other WCDs. In general, the wireless access network may operate in accordance with a particular radio access technology or "air interface protocol," such as various Wireless Local Area Network (WLAN) protocols (e.g., IEEE 802.11 (WiFi) protocols), among others.

Such connectivity to a packet-switched network may facilitate communication services such as voice over Internet Protocol (VoIP) based call connections, and other packet-based real-time media services (e.g., video sessions, etc.). Typically, an example WAP would support industry standard packet-based signaling and bearer communication protocols, such as Session Initiation Protocol (SIP) signaling, Real-time Transport Protocol (RTP) bearer communication, and or Hypertext Transfer Protocol (HTTP) messages, for instance.

As WCDs are typically mobile, it has become standard practice to provide location-based services keyed to WCD location. To engage in these services, a WCD may report its location to a location-based service provider (LBSP) to enable the LBSP to provide a location based service based on the provided location. Examples of such services take various forms, including, without limitation, providing navigation guidance and information about points of interest, tracking packages or other objects, locating lost or stolen WCDs, and providing emergency response service (e.g., 911 call routing and dispatching of emergency personnel). In one example, when a WCD is being served by a WAP, the WCD may report to a LBSP as the WCD's location a representative location of the WAP. Such a location may be a street address, geographic coordinates of the WAP, or some other information indicative of location. In such an example, when the WCD requests the location-based service from the LBSP, the WCD reports the representative location of the WAP as the WCD's location, and the LBSP takes action (e.g., providing information, dispatching assistance, etc.) based on that location.

Overview

In practice, a LBSP could learn the location of a WCD in a variety of ways. For example, the LBSP could receive from the WCD itself a report of the WCD's location. As another example, when the WCD is being served by a wireless network, the LBSP could receive from a location-determination platform associated with that wireless network a report of the WCD's location as determined by the platform. As yet another example, as discussed above, when the WCD is being served by a WAP, the WCD may report to the LBSP as the WCD's location a representative location of the WAP. To do so, the WCD may have stored a location of the WAP while the WCD is within coverage of the WAP. The WCD may then be configured to report the stored location of the WAP to the LBSP when the WCD is within coverage of the WAP and when the WCD requests the location-based service from the LBSP while the WCD is being served by the WAP.

In one particular example, a user may use the WCD to place a VoIP call to a LBSP while being served by the WAP. For example, a user may place a VoIP call to an emergency services provider to receive emergency services at the WCD's location. In such an example, while the WCD is being served by the WAP, the WCD may use SIP signaling to set up the VoIP call to the emergency services provider. For instance, the WCD may generate and transmit a SIP INVITE message to set up the VoIP call. The SIP INVITE message transmitted by the WCD generally functions to invoke initiation of an RTP session between the WCD and the emergency services provider. The WCD may include in its SIP INVITE message an indication of the stored location of the WAP as a representative location of the WCD. The emergency services provider may then receive the SIP INVITE message, and respond with a SIP 200 OK message. And the WCD may then send a SIP ACK message to the emergency services provider, completing establishment of an RTP session, and thereby allowing the emergency services provider to communicate with a user of the WCD. Further, the emergency services provider may use the received indication of the stored location of the WAP to provide dispatch emergency services to that location.

In one example, the WAP used to serve the WCD may be a portable WAP, such as a portable WiFi (e.g., IEEE 802.11) access point, or a portable cellular base station, such as a femtocell. As the WAP may be portable, a user who owns and/or operates such a portable WAP may move the WAP from one location to another. For instance, the user may move residences from a first residence to a second residence, and take the portable WAP to the second residence. The user may connect the portable WAP to a router on a LAN at the second residence to facilitate connectivity to a packet-switched network. In one example, the second residence may be a significant distance from the first residence (e.g., several states away). When the user moves the portable WAP to the second residence, the WCD may have an incorrect location of the WAP (e.g., the street address for the first residence) stored in its data storage. As a result, when the user uses the WCD to request a location-based service while the WCD is being served by the portable WAP, the location information that is passed to the LBSP would be incorrect, which could result in failure of LBSP (e.g., emergency service personnel) to properly assist the user. Disclosed herein are methods and systems to help avoid this type of problem.

In a first instance, when the WCD is within coverage of the portable WAP, the WCD stores a correlation between the portable WAP and the location of the portable WAP. Further, the WCD will also scan for and detect one or more cellular coverage area identifiers, which may help establish where the portable WAP is located. The WCD may then store the detected cellular coverage area identifier(s) in correlation with the portable WAP (e.g., as another data point in the correlation data). In a later instance, when the WCD is again associated with the portable WAP, the WCD may then scan for cellular coverage again. If the WCD finds the same cellular coverage area identifier(s) that the WCD has stored in correlation with the portable WAP, then the WCD would thereby deem the stored WAP location to be accurate. Whereas, if the WCD does not find the same cellular coverage area identifier(s) that the WCD has stored in correlation with the portable WAP, then the WCD would thereby conclude that the stored WAP location is suspect, and the WCD may responsively prompt a user to enter a new location for the WAP. The WCD may then store the new location in correlation with the WAP.

In practice, the WCD may perform this re-scanning for cellular coverage in response to the WCD seeking to invoke/request a location-based service. At that time, if the WCD determines that the WCD is not within the same cellular coverage that the WCD has correlated with the portable WAP, then the WCD may forgo sending to the LBSP the WAP location that the WCD has stored. Further, the WCD may prompt a user to enter a new WAP location, and the WCD may store that newly entered WAP location in correlation with the portable WAP and may report that newly entered WAP location, rather than the previously stored WAP location, to the LBSP, to facilitate the location-based service.

Thus, in one respect, disclosed is a method for controlling reporting of location to a LBSP to facilitate implementation of a location-based service for a WCD. In accordance with the method, the WCD stores a location of a portable WAP and is configured to report the stored location of the portable WAP to the LBSP when the WCD is within coverage of the portable WAP and requests the location-based service from the LBSP. While the WCD is within coverage of the portable WAP, (i) the WCD uses a wireless-communication interface to detect that the WCD is also within one or more particular cellular coverage areas and (ii) responsive to thereby detecting that the WCD is within coverage of the one or more particular cellular coverage areas while within coverage of the portable WAP, the WCD stores a correlation between the portable WAP and the one or more particular cellular coverage areas. Thereafter, while the WCD is again within coverage of the portable WAP, the WCD uses the wireless-communication interface to scan for coverage of the one or more particular cellular coverage areas but determines from the scanning that the WCD is not within coverage of the one or more particular cellular coverage areas. In response to determining that the WCD is not within coverage of the one or more particular cellular coverage areas, the WCD then reconfigures itself to not report the stored location of the portable WAP to the LBSP when the WCD requests the location-based service.

In another respect, disclosed is a method of controlling implementation of a location-based service for a WCD. The method may involve associating by the WCD with a portable WAP that provides wireless coverage in which to serve the WCD, and storing by the WCD a location of the portable WAP for use to facilitate a location-based service when the WCD is associated with the portable WAP. Further, the method may involve, when the WCD is associated with the portable WAP, the WCD using a wireless-communication interface to detect that the WCD is also within coverage of one or more particular cellular coverage areas, and, responsive to detecting that the WCD is within coverage of the one or more particular cellular coverage areas when the WCD is associated with the portable WAP, storing by the WCD a correlation between the portable WAP and the one or more particular cellular wireless coverage areas. And still further, the method may involve, thereafter again associating by the WCD with the portable WAP, and when the WCD is so again associated with the portable WAP, the WCD (i) using the wireless-communication interface to scan for the one or more particular cellular coverage areas, (ii) determining, based on the scanning, that the WCD is not within coverage of the one or more particular cellular coverage areas, and (iii) responsive to the determining, avoiding use of the stored location of the portable WAP to facilitate the location-based service.

And in still another respect, disclosed is a WCD configured to control implementation of a location-based service. As disclosed, such a WCD may include a wireless-communication interface, data storage, and a controller. The controller may be configured to associate the WCD with a portable WAP that provides wireless coverage in which to serve the WCD, and store in the data storage of the WCD a location of the portable WAP for use to facilitate a location-based service when the WCD is associated with the portable WAP. Further, the controller may be configured to cause the wireless-communication interface to detect that the WCD is within coverage of one or more particular cellular coverage areas while the WCD is associated with the portable WAP, and responsive to detecting that the WCD is within coverage of the one or more particular cellular coverage areas when the WCD is associated with the portable WAP, store in the data storage of the WCD a correlation between the portable WAP and the one or more particular cellular wireless coverage areas. Further still, the controller may be configured to thereafter again associate the WCD with the portable WAP, and when the WCD is so again associated with the portable WAP, the controller is configured to (i) use the wireless-communication interface to scan for the one or more particular cellular coverage areas, (ii) determine, based on the scanning, that the WCD is not within coverage of the one or more particular cellular coverage areas, and (iii) responsive to determining that the WCD is not within coverage of the one or more particular cellular coverage areas, cause the WCD to avoid use of the stored location of the portable WAP to facilitate the location-based service.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
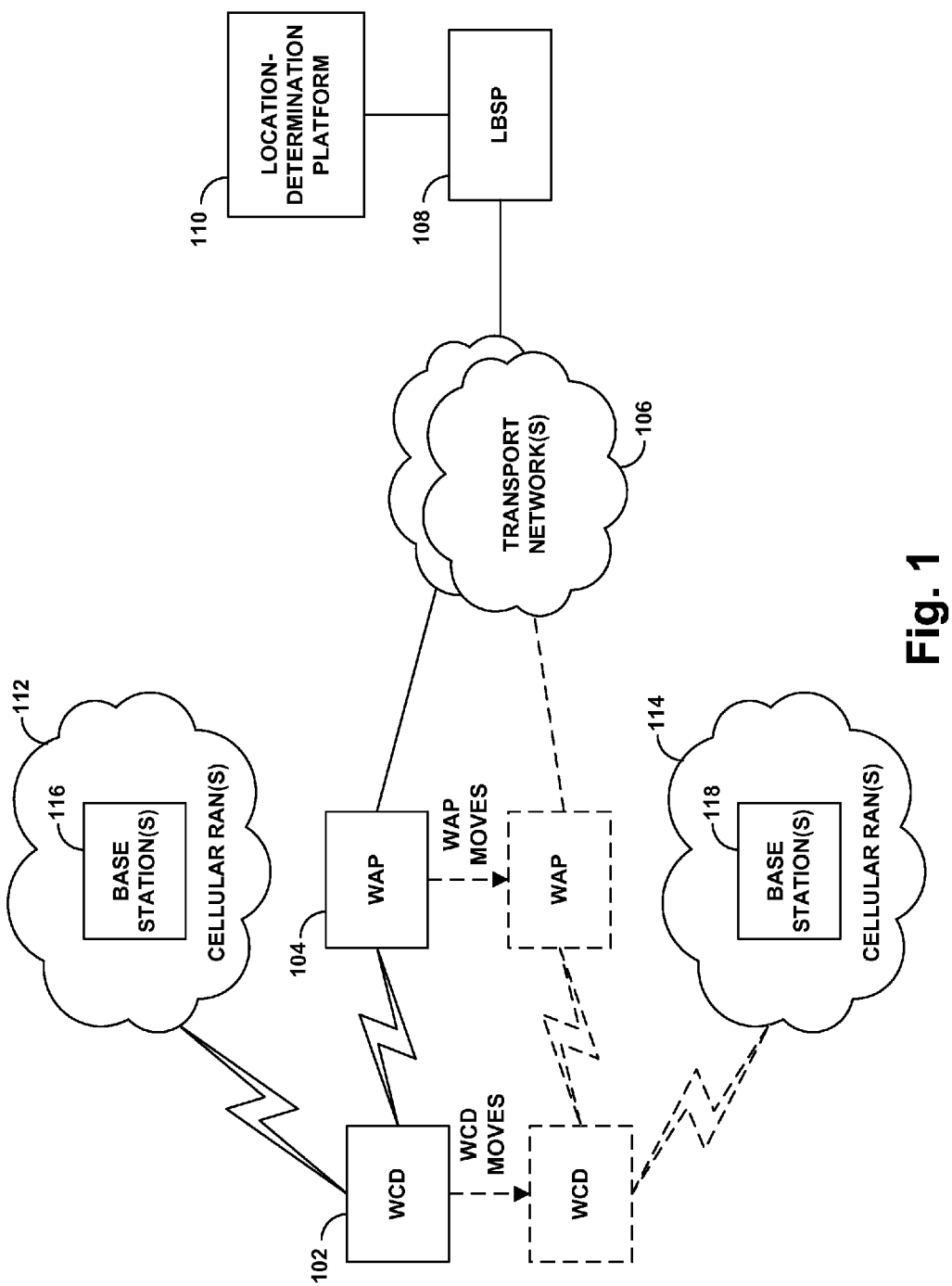
FIG. 1 is a simplified block diagram of an example wireless network in which principles of the present disclosure can be implemented.

Referring to the drawings, FIG. 1 is a simplified block diagram of an example wireless network in which embodiments of the present method and apparatus can be implemented. It should be understood, however, that these and other arrangements described herein are set forth for purposes of example only and that numerous variations are possible. For instance, elements, arrangements, and functions may be added, removed, combined, distributed, or otherwise modified. In addition, it will be understood that features described here as being performed or provided by one or more entities may be implemented in various ways, such as by a processor executing programmed instructions for instance.

As shown in FIG. 1, the example wireless network includes a representative WCD 102 within coverage of a portable WAP 104. The WCD 102 may be any device that is equipped to engage in wireless communication and to carry out various WCD functions described herein. By way of example, the WCD 102 may be a cell phone, or wirelessly-equipped tablet, computer, tracking device, appliance, embedded wireless module, or other wirelessly-equipped device of a type now known or later developed. The portable WAP 104 may be a portable WiFi (e.g., IEEE 802.11) access point, or a portable cellular base station, such as a femtocell. Other examples are possible as well. The portable WAP 104 may be coupled with network infrastructure that provides connectivity with one or more transport networks 106, such as the PSTN or the Internet for instance. For example, the portable WAP 104 may be connected to a router on a LAN, which is served by an Internet Service Provider (ISP) that provides connectivity with the one or more transport networks 106. In practice, the portable WAP 104 may have a unique coverage identifier, such as a service set identifier (SSID) or a MAC address, as examples. Such a coverage identifier may be detected by the WCD 102 when the WCD 102 is within coverage of the portable WAP 104, and the WCD 102 may associate with the portable WAP 104 using the coverage identifier to engage in air interface communication with the portable WAP 104. The WCD 102 may then communicate via the portable WAP 104 with various remote network entities or with other WCDs.

Shown accessible via at least one transport network 106 is an example LBSP 108, which could be an emergency services network (e.g., including a public safety answering point (PSAP)), a navigation server, or any other type of LBSP configured to provide at least one location-based service keyed to the location of WCD 102. With the arrangement of FIG. 1, LBSP 108 may seek to provide a location-based service keyed to the location of WCD 102 and may thus need to determine the location of the WCD 102 to facilitate providing that service. For simplicity, the remainder of this description will address the scenario where the LBSP 108 is a PSAP (or more generally an emergency services system) that the WCD 102 calls or otherwise contacts to request emergency assistance, in which case the LBSP 108 would need to determine the WCD's location in order to facilitate dispatching emergency assistance to that location. It should be understood, however, that the principles discussed in this document can apply as well in numerous other situations where location of a WCD may be used to facilitate providing a location-based service.

In line with the discussion above, the LBSP 108 (PSAP) may learn the location of the WCD 102 in various ways. By way of example, the LBSP 108 could receive an indication of the WCD's location from the WCD 102 itself. For instance, if the WCD 102 engages in SIP or other such signaling to set up a VoIP call to the LBSP 108, the WCD 102 could include an indication of its location in that signaling so that the LBSP 108 receives the indication at the time of the call setup. As another example, the LBSP 108 could receive an indication of the WCD's location from a location-determination platform 110, which could receive an indication of the WCD's location from the WCD 102 or could determine the WCD's location in various other ways. In the scenario where the LBSP 108 obtains the WCD's location from the location-determination platform 110, the LBSP 108 could request and receive the location, or the location-determination platform 110 could push the information to the LBSP 108.

As yet another example, as discussed above, when the WCD 102 is being served by the portable WAP 104, the WCD 102 may report to the LBSP 108 as the WCD's location a representative location of the portable WAP 104. To do so, the WCD 102 may be configured to store correlation data that correlates each of one or more WAP coverage identifiers (e.g., SSIDs or MAC addresses) with a respective WAP location. The stored location may be a street address, or geographic coordinates of the portable WAP 104, or some other information indicative of location.

The WCD 102 may be configured such that, when the WCD 102 is associated with the portable WAP 104 having a particular WAP coverage identifier, the WCD 102 may check whether the WCD 102 has stored an indication of the WAP location corresponding with that particular WAP coverage identifier. If not, then the WCD 102 may prompt a user to enter a location for that portable WAP 104, and the WCD 102 may then store that location in correlation with the WAP coverage identifier (e.g., SSID or MAC address). Whereas, if the WCD 102 does have a stored indication of the WAP location corresponding with that WAP coverage identifier, then the WCD 102 may assume that the stored WAP location is correct. The WCD 102 may thus report to the LBSP 108 the WAP location that the WCD 102 has stored for the portable WAP 104 currently serving the WCD 102, to facilitate a location-based service. For instance, if the WCD 102 engages in SIP or other such signaling to set up its call to the LBSP 108 through the portable WAP 104, the WCD 102 could include an indication of the location of the portable WAP 104 in that signaling so that the LBSP 108 receives the indication at the time of the call setup.

As shown in FIG. 1, the portable WAP 104 may be moved to a different location. However, the WCD 102 may still have stored the original location for the portable WAP 104. In such a scenario, when the WCD 102 again associates with the portable WAP 104 in the new location, the WCD 102 may thus conclude that the WCD 102 has a stored location of the portable WAP 104, and so the WCD 102 may have no reason to prompt a user for entry of a new location of the portable WAP 104. When the WCD 102 is so associated with the portable WAP 104 and then seeks a location-based service, the WCD 102 may thus report the original WAP location to the LBSP 108, but the reported location would be incorrect.

To address this issue, the WCD 102 may use cellular coverage as a basis to verify stored WAP location corresponding to a given WAP (e.g., a WAP with a given SSID and/or MAC address). As shown in FIG. 1, the example wireless network includes cellular radio access network(s) (RAN(s)) 112 and 114, including base stations 116 and 118 (e.g., base transceiver stations (BTS), access nodes, node-Bs, eNodeBs (eNB), or the like) that radiate to define a number of cells or cell sectors. These cells or cell sectors represent cellular coverage areas in which the RAN(s) may serve the WCD 102. These cells or cell sectors may extend to the location where the portable WAP 104 is located. Further, base stations 116 and 118 may be configured to provide wireless service in accordance with one or more air interface protocols, examples of which include Orthogonal Frequency Division Multiple Access (OFDMA) (e.g., Long Term Evolution (LTE)), Code Division Multiple Access (CDMA), Global System for Mobile Communication (GSM), and/or others now known or later developed. Each protocol may define its own procedures and parameters related to air interface communication.

In practice, in each coverage area provided by a particular base station, the base station may broadcast a pilot signal (e.g., reference signal) that WCDs such as WCD 102 can monitor as basis to detect coverage and evaluate coverage strength. Further, each coverage area may have a respective coverage area identifier, such as a Physical Cell Identity (PCI) and/or pseudo-noise offset (PN offset) for instance, which could be encoded in or otherwise represented by the pilot signal broadcast in the coverage area and/or by associated signaling, possibly in combination with an identifier of the base station that provides the coverage area. Thus, the WCD 102 may monitor pilot signals to detect and evaluate coverage strength and may further determine the identity of the coverage area corresponding to the WCD's current location. As shown in FIG. 1, there would be different cellular coverage at the WCD's different locations, and thus there would be different coverage area identifiers. Such various cellular coverage areas could be provided by the same or different cellular service providers. For example, cellular RAN(s) 112 may be owned and operated by a first cellular service provider, while cellular RAN(s) 114 may be owned and operated by a second cellular service provider. In another example, cellular RAN(s) 112 and 114 may be owned and operated by the same cellular service provider.

The WCD 102 may be configured to detect cellular coverage where the portable WAP 104 is located, and use that cellular coverage as a basis to validate a stored WAP location. In a first instance, when the WCD 102 is associated with the portable WAP 104 and stores a correlation between the portable WAP's identity (e.g., SSID and/or MAC address) and the WAP's location, the WCD 102 will also scan for and detect one or more cellular coverage area identifiers, which may help establish where the portable WAP 104 is located. The WCD 102 may then store the detected cellular coverage area identifier(s) in correlation with the portable WAP 104.

In a later instance, when the WCD 102 is again associated with the portable WAP 104, the WCD 102 may again scan for cellular coverage. If the WCD 102 finds the same cellular coverage area identifier(s) that the WCD 102 has stored in correlation with the portable WAP 104, then the WCD 102 would thereby deem the stored WAP location to be valid. Whereas, if the WCD 102 does not find the same cellular coverage area identifier(s) that the WCD 102 has stored in correlation with the portable WAP 104, then the WCD 102 would thereby conclude that the stored WAP location is suspect, and the WCD 102 may responsively prompt a user to enter a new location for the portable WAP 104. The WCD 102 may then store the new location in correlation with the portable WAP 104.

In a particular example as illustrated in FIG. 1, the portable WAP 104 is initially at a first location. At the first location, while the WCD 102 is within coverage of the portable WAP 104, the WCD 102 detects one or more coverage area identifiers corresponding to base station(s) 116. The WCD 102 may then store the detected cellular coverage area identifier(s) corresponding to base station(s) 116 in correlation with the portable WAP 104. Subsequently, the portable WAP 104 may move to a second location. When the WCD 102 is within coverage of the portable WAP 104 at the second location, the WCD 102 may again scan for cellular coverage. Since the WCD 102 has moved to the second location, the WCD 102 detects one or more coverage area identifiers corresponding to base station(s) 118. As such, the WCD 102 determines that it is no longer within coverage of the base station(s) 116. In response, the WCD 102 determines that the stored WAP location is suspect.

In practice, the WCD 102 may perform this re-scanning for cellular coverage in response to the WCD 102 seeking to invoke/request a location-based service. At that time, if the WCD 102 determines that the WCD 102 is not within the same cellular coverage that the WCD 102 has correlated with the portable WAP 104, then the WCD 102 may responsively forgo sending to the LBSP 108 the WAP location that the WCD 102 has stored. Further, the WCD 102 may responsively prompt a user to enter a new WAP location, and the WCD 102 may store that newly entered WAP location in correlation with the portable WAP 104 and may report that newly entered WAP location, rather than the previously stored WAP location, to the LBSP 108, to facilitate the location-based service.

Figure 2:
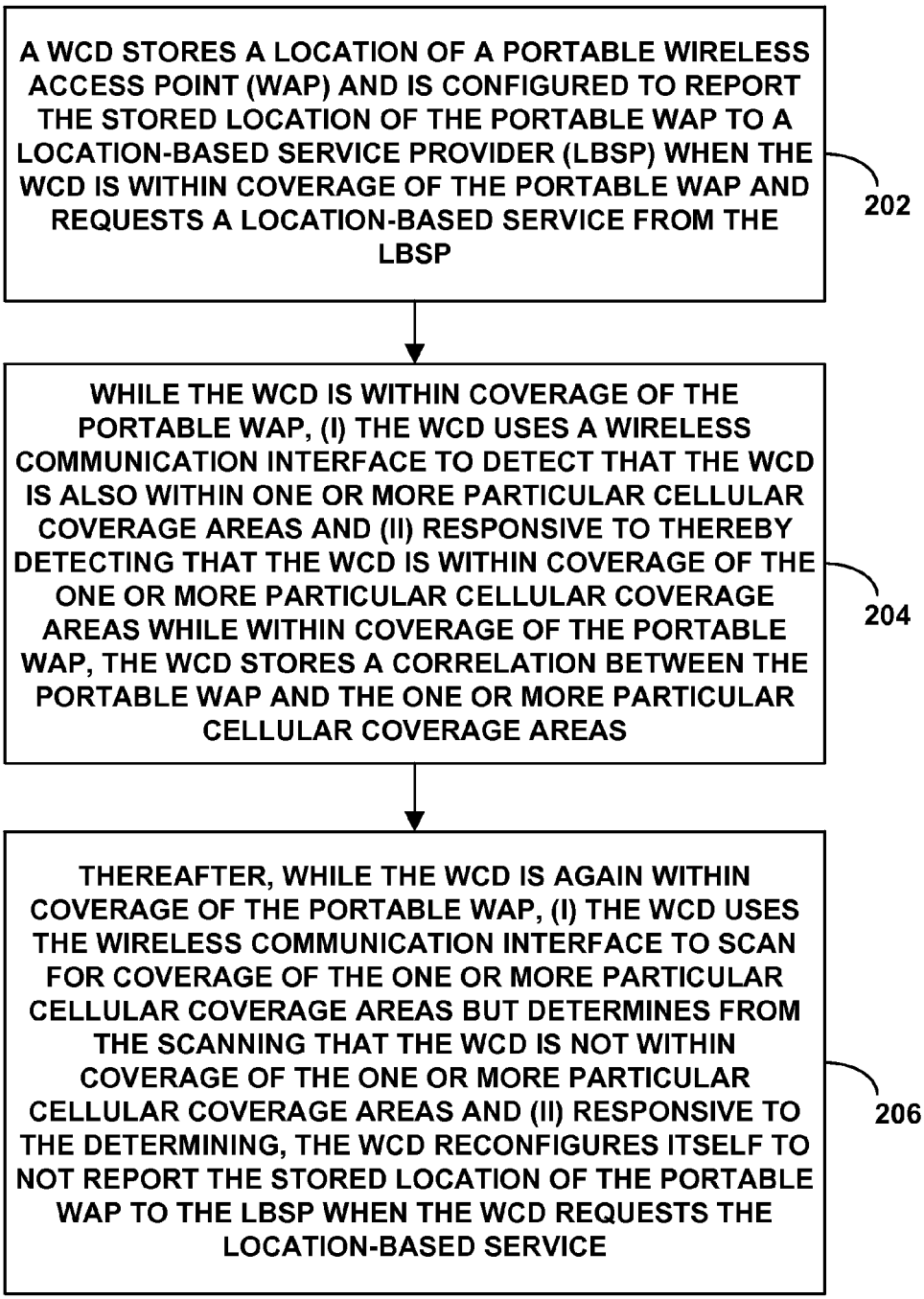
FIG. 2 is a flow chart depicting operations that can be carried out in accordance with the disclosure.

FIG. 2 is a flow chart depicting example operations that can be carried out in accordance with this disclosure, to control reporting of location to a LBSP to facilitate implementation of a location-based service for a WCD. As shown in FIG. 2, at block 202, the WCD stores a location of a portable WAP and is configured to report the stored location of the portable WAP to the LBSP when the WCD is within coverage of the portable WAP and requests the location-based service from the LBSP. As discussed above, the stored location may be a street address, or geographic coordinates of the portable WAP, or some other information indicative of location. The location may be stored in data storage of the WCD.

At block 204, while the WCD is within coverage of the portable WAP, (i) the WCD uses a wireless-communication interface to detect that the WCD is also within one or more particular cellular coverage areas (e.g., other than the WAP coverage area) and (ii) responsive to thereby detecting that the WCD is within coverage of the one or more particular cellular coverage areas while within coverage of the portable WAP, the WCD stores a correlation between the portable WAP and the one or more particular cellular coverage areas. In one example, storing the correlation between the portable WAP and the one or more particular cellular coverage areas may involve storing a correlation between a unique coverage identifier of the portable WAP and one or more coverage area identifiers corresponding to the one or more particular cellular coverage areas. As discussed above, the unique identifier of the portable WAP may be an SSID or a MAC address, as examples. In addition, the one or more coverage area identifiers may include one or more PCIs or one or more PN offsets, for instance.

At block 206, thereafter, while the WCD is again within coverage of the portable WAP, (i) the WCD uses the wireless-communication interface to scan for coverage of the one or more particular cellular coverage areas but determines from the scanning that the WCD is not within coverage of the one or more particular cellular coverage areas, and (ii) responsive to the determining, the WCD reconfigures itself to not report the stored location of the portable WAP to the LBSP when the WCD requests the location-based service. In one example, the WCD may scan for coverage of the one or more particular cellular coverage areas each time the WCD seeks to place a VoIP call using the portable WAP. In another example, the WCD may scan for coverage of the one or more particular cellular coverage areas periodically, such as every 15 minutes, or daily, for example. In yet another example, the WCD may scan for coverage of the one or more particular cellular coverage areas in response to detected movement of the WCD (e.g., movement detected by one or more sensors of the WCD). Other examples are possible as well.

In one embodiment, the WCD may store in correlation with the portable WAP a correlation between the portable WAP and a plurality of cellular coverage areas detected by the WCD while within coverage of the portable WAP. For instance, if the WCD is initially in an area of overlap between three cellular coverage areas, the WCD may store a correlation between each of the three cellular coverage areas and the portable WAP. In such an example, thereafter if the WCD determines that each of the one or more cellular areas detected from the scanning does not match all three of the cellular coverage areas stored in correlation with the portable WAP, the WCD may responsively reconfigure itself to not report the stored location of the portable WAP to the LBSP when the WCD requests the location-based service.

In another example, the WCD may determine a level of confidence in its comparison between the one or more particular cellular coverage areas stored in correlation with the WAP and one or more cellular coverage areas thereafter detected by the WCD. For instance, in the scenario noted above with three cellular coverage areas stored in correlation with the portable WAP, there would be a high level of confidence if each of the three coverage areas match in the WCD's comparison between the one or more particular cellular coverage areas stored in correlation with the WAP and the one or more cellular coverage areas thereafter detected by the WCD. The level of confidence may be represented by a percentage, for example. Thus, if each of the three coverage areas match, the level of confidence would be 100%. If one of the three cellular coverage areas does not match, the level of confidence would be 66%. If two of the three cellular coverage areas do not match, the level of confidence would be 33%. Further, if none of the three cellular coverage areas match, the level of confidence would be 0%.

If the determined level of confidence does not exceed a threshold, the WCD may responsively report the level of confidence with the location report to the LBSP when the WCD requests the location-based service. Such a threshold may be expressed as a percentage, such as 50% for example. Using the example levels of confidence above, if all three coverage areas match in the comparison between the one or more particular cellular coverage areas stored in correlation with the WAP and the one or more cellular coverage areas thereafter detected by the WCD, then the level of confidence would exceed the threshold, since 100% is greater than 50%. In such a scenario, the WCD will report the stored location of the portable WAP to the LBSP when the WCD requests the location-based service. In another example, if two of the three cellular coverage areas do not match, then the level of confidence (33%) does not exceed the threshold, and the WCD would then responsively report the level of confidence with the location report to the LBSP when the WCD requests the location-based service.

Figure 3:
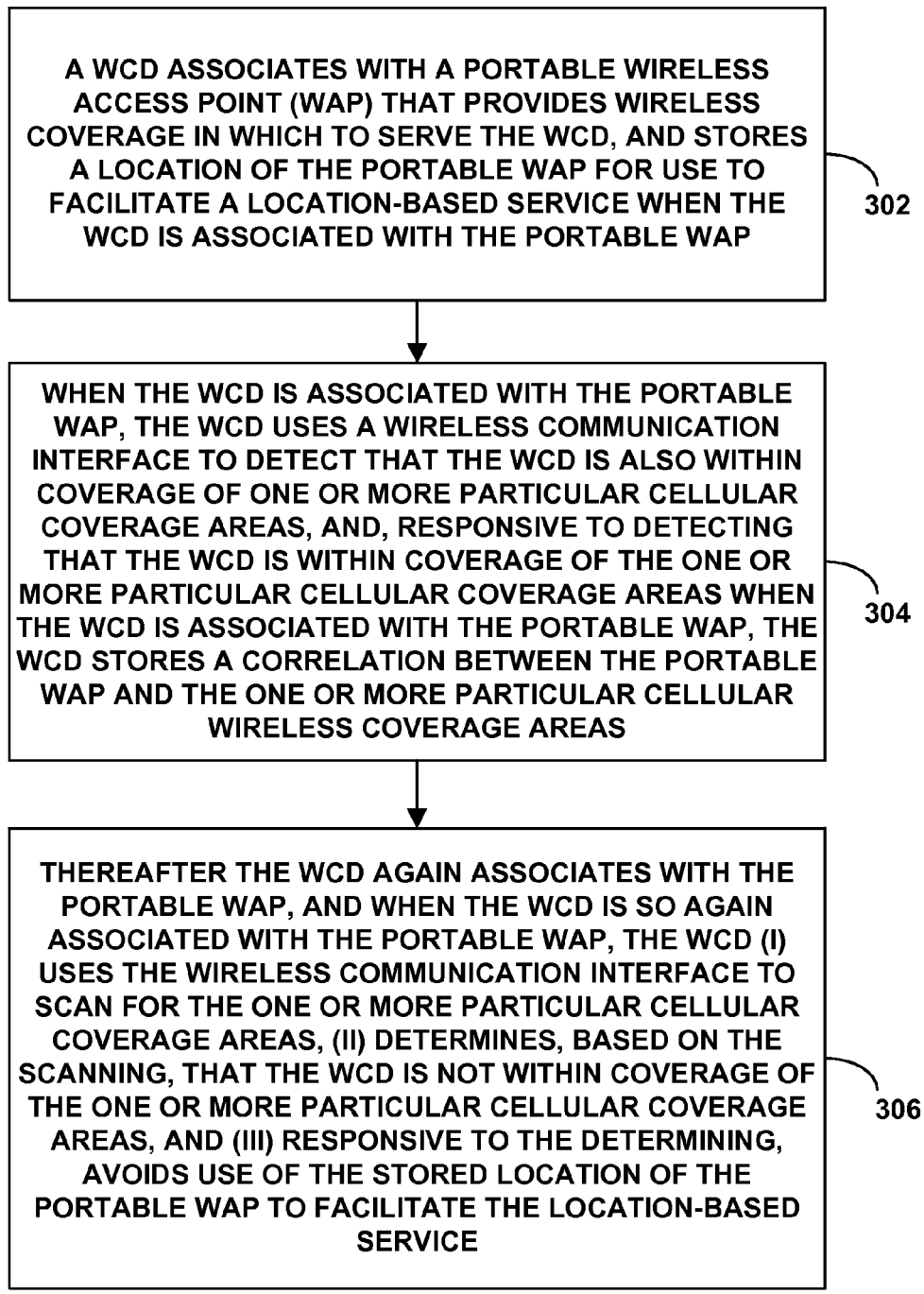
FIG. 3 is another flow chart depicting operations that can be carried out in accordance with the disclosure.

FIG. 3 is next another flow chart depicting operations that can be carried out in accordance with the present disclosure, to control implementation of a location-based service for a WCD. As shown in FIG. 3, at block 302, the WCD associates with a portable WAP that provides wireless coverage in which to serve the WCD, and the WCD stores a location of the portable WAP for use to facilitate a location-based service when the WCD is associated with the portable WAP. The WCD associates with the portable WAP by engaging in a registration, or "attachment," process. In one example, the registration process includes a user selecting a WiFi network name corresponding to the portable WAP. In another example, the registration process further includes a user entering a password assigned to the portable WAP. Other examples are possible as well.

At block 304, when the WCD is associated with the portable WAP, the WCD uses a wireless-communication interface to detect that the WCD is also within coverage of one or more particular cellular coverage areas, and, responsive to detecting that the WCD is within coverage of the one or more particular cellular coverage areas when the WCD is associated with the portable WAP, the WCD stores a correlation between the portable WAP and the one or more particular cellular wireless coverage areas.

At block 306, thereafter again associating by the WCD with the portable WAP, and when the WCD is so again associated with the portable WAP, the WCD (i) uses the wireless-communication interface to scan for the one or more particular cellular coverage areas, (ii) determines, based on the scanning, that the WCD is not within coverage of the one or more particular cellular coverage areas, and (iii) responsive to the determining, avoids use of the stored location of the portable WAP to facilitate the location-based service.

Further, the WCD avoiding use of the stored location of the portable WAP to facilitate the location-based service may include the WCD transmitting to the LBSP an indication that the stored location is incorrect. In one example, the WCD may include a statistical certainty measure of the indication that the stored location is incorrect. For example, the WCD may include the level of confidence as the statistical certainty measure, as discussed above. In another example, the WCD avoiding by the WCD use of the stored location of the portable WAP to facilitate the location-based service may include the WCD forgoing transmitting the location of the portable WAP to the LBSP. The location-based provider may then process a request for location-based services as if no location was provided, for example by requesting a user to provide location information.

The stored location of the portable WAP may be a first location of the portable WAP. In such an example, avoiding by the WCD use of the stored location of the portable WAP to facilitate the location-based service may include the WCD outputting, on a user interface of the WCD, a prompt for user entry of a second location of the portable WAP. The second location could be a street address, geographic coordinates, or some other information indicative of location. The WCD may, in response to the prompt, receive the user entry of a current location of the portable WAP as the second location. The WCD may then store, in place of the first location of the portable WAP, the received second location of the portable WAP. Finally, the WCD may then use the received second location of the portable WAP, rather than the first location of the portable WAP, to facilitate the location-based service.

Figure 4:
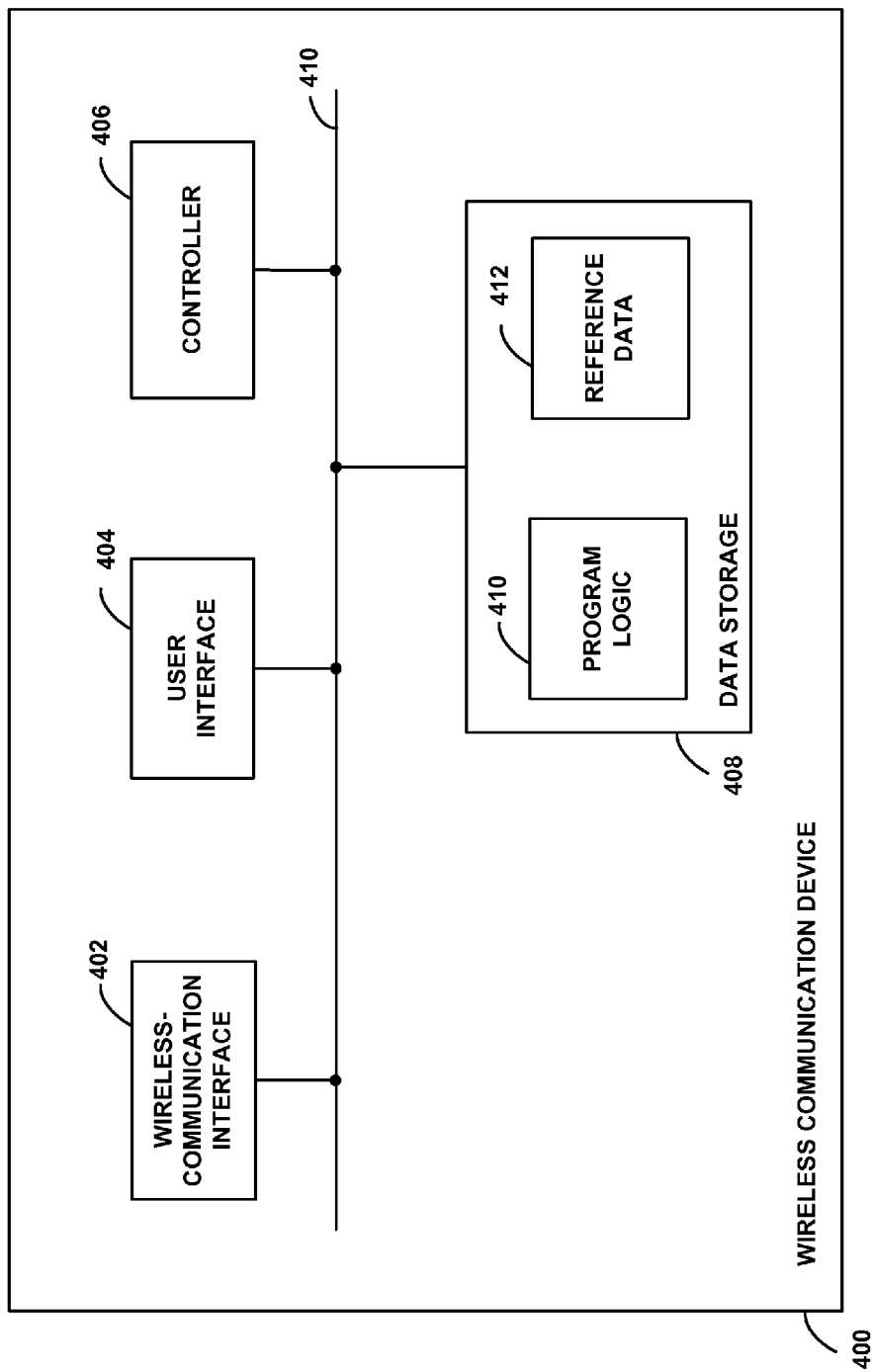
FIG. 4 is a simplified block diagram of an example WCD operable in accordance with the disclosure.

Those skilled in the art will appreciate that there can be numerous specific implementations of a WCD that may be used in connection with at least one embodiment of the method described herein. By way of example, FIG. 4 is a simplified block diagram of a WCD 400, showing functional components that can be included in such a device to facilitate implementation of at least one embodiment.

As shown, the example device includes a wireless-communication interface 402, a user interface 404, a controller 406, and data storage 408, all of which may be coupled together by a system bus, network, or other connection mechanism 410.

Wireless-communication interface 402 may be or include any combination of hardware and software modules that WCD 400 uses to communicate in a wireless manner with one or more other entities. As such, wireless-communication interface 402 may have one or more chipsets suitable for wireless communication, and/or one or more other components suitable for engaging in data communication. For instance, wireless-communication interface 402 may operate in compliance with one of the air-interface protocols noted above.

User interface 404 may include one or more input and/or output components to facilitate interaction with a user of the device. As such, the user interface may include input components such as a keypad, touchpad, touch-sensitive display, microphone, and camera, and the user interface may further include output components such as a display screen and a sound speaker or headset jack. Other input and output components are possible as well.

Controller 406 may include one or more general purpose processors (e.g., microprocessors) and/or one or more special purpose processors (e.g., digital signal processors, application specific integrated circuits, etc.) and may be integrated in whole or in part with wireless-communication interface 402 and/or other components of the WCD.

Data storage 408 may include one or more volatile and/or non-volatile storage components, such as optical, magnetic, flash, or other storage components, and may be integrated in whole or in part with the controller 406. Data storage 408 may include any type of non-transitory computer-readable medium or media, such as a storage device that includes a disk and/or a hard drive, as examples. The computer-readable medium may include media arranged to store data for short periods of time, such as register memory, processor cache, and/or random access memory (RAM), as examples. The computer-readable medium may also or instead include media arranged to serve as secondary or more persistent long-term storage, such as read only memory (ROM), optical disks, and/or magnetic disks, as examples. The computer-readable media may also or instead include any other volatile and/or non-volatile storage system or systems deemed suitable for a given implementation.

As shown, representative data storage 408 includes program logic 410 and reference data 412. Program logic 410 may include instructions executable by controller 406 to carry out various WCD functions described herein. The non-transitory data storage 408 may also hold reference data 412 for use in accordance with the present method, such as correlation data correlating a portable WAP coverage identifier with a location of the portable WAP, and correlation data correlating the portable WAP coverage identifier with one or more cellular coverage area identifiers.

These various elements may be integrated together, distributed, or modified in various ways, and the WCD may have more or fewer elements than these.

While exemplary embodiments have been described, persons of skill in the art will appreciate that variations may be made without departure from the scope and spirit of the invention. This true scope and spirit is defined by the appended claims, which may be interpreted in light of the foregoing.

We claim:

1. A method for controlling reporting of location to a location-based service provider (LBSP) to facilitate implementation of a location-based service for a wireless communication device (WCD), wherein the WCD stores a location of a portable wireless access point (WAP) and is configured to report the stored location of the portable WAP to the LBSP when the WCD is within coverage of the portable WAP and requests the location-based service from the LBSP, the method comprising:

while the WCD is within coverage of the portable WAP, (i) the WCD using a wireless-communication interface to detect that the WCD is also within one or more particular cellular coverage areas and (ii) responsive to thereby detecting that the WCD is within coverage of the one or more particular cellular coverage areas while within coverage of the portable WAP, the WCD storing a correlation between the portable WAP and the one or more particular cellular coverage areas; and thereafter, while the WCD is again within coverage of the portable WAP, (i) the WCD using the wireless-communication interface to scan for coverage of the one or more particular cellular coverage areas but determining from the scanning that the WCD is not within coverage of the one or more particular cellular coverage areas and (ii) responsive to the determining, the WCD reconfiguring itself to not report the stored location of the portable WAP to the LBSP when the WCD requests the location-based service.

2. The method of claim 1, wherein determining from the scanning that the WCD is not within coverage of the one or more particular cellular coverage areas comprises:

determining that a level of confidence in a comparison between the one or more particular cellular coverage areas and one or more cellular coverage areas detected from the scanning does not exceed a threshold.

3. The method of claim 1, wherein determining from the scanning that the WCD is not within coverage of the one or more particular cellular coverage areas comprises:

determining that each of one or more cellular areas detected from the scanning does not match each of the one or more particular cellular coverage areas.

4. The method of claim 1, wherein the WCD storing the correlation between the portable WAP and the one or more particular cellular coverage areas comprises storing a correlation between an identifier of the portable WAP and one or more coverage area identifiers corresponding to the one or more particular cellular coverage areas.

5. The method of claim 4, wherein the one or more coverage area identifiers comprise one or more Physical Cell Identities (PCIs) or one or more pseudo-noise (PN) offsets.

6. The method of claim 1, wherein the WCD reconfiguring itself to not report the stored location of the portable WAP to the LBSP when the WCD requests the location-based service comprises:

transmitting to the LBSP an indication that the stored location is incorrect.

7. The method of claim 6, wherein transmitting to the LBSP the indication that the stored location is incorrect comprises including a statistical certainty measure of the indication that the stored location is incorrect.

8. The method of claim 1, wherein the stored location of the portable WAP is a first location of the portable WAP, and wherein the WCD reconfiguring itself to not report the stored location of the portable WAP to the LBSP when the WCD requests the location-based service comprises:

outputting by the WCD, on a user interface, a prompt for user entry of a second location of the portable WAP;

receiving by the WCD, in response to the prompt, the user entry of a current location of the portable WAP as the second location;

storing by the WCD, in place of the first location of the portable WAP, the received second location of the portable WAP; and using by the WCD the received second location of the portable WAP, rather than the first location of the portable WAP, to facilitate the location-based service.

9. The method of claim 1, wherein the LBSP is an emergency service provider, and wherein the location-based service is emergency service.

10. A method of controlling implementation of a location-based service for a wireless communication device (WCD), the method comprising:
  associating by the WCD with a portable wireless access point (WAP) that provides wireless coverage in which to serve the WCD, and storing by the WCD a location of the portable WAP for use to facilitate a location-based service when the WCD is associated with the portable WAP;
  when the WCD is associated with the portable WAP, the WCD using a wireless-communication interface to detect that the WCD is also within coverage of one or more particular cellular coverage areas, and, responsive to detecting that the WCD is within coverage of the one or more particular cellular coverage areas when the WCD is associated with the portable WAP, storing by the WCD a correlation between the portable WAP and the one or more particular cellular wireless coverage areas; and
  thereafter again associating by the WCD with the portable WAP, and when the WCD is so again associated with the portable WAP, the WCD (i) using the wireless-communication interface to scan for the one or more particular cellular coverage areas, (ii) determining, based on the scanning, that the WCD is not within coverage of the one or more particular cellular coverage areas, and (iii) responsive to the determining, avoiding use of the stored location of the portable WAP to facilitate the location-based service.

11. The method of claim 10, wherein the WCD transmits to a LBSP a request for the location-based service, wherein using the stored location of the portable WAP to facilitate the location-based service comprises retrieving the stored location and transmitting the location to the LBSP to enable the LBSP to provide the requested location-based service based on the location.

12. The method of claim 11, wherein avoiding by the WCD use of the stored location of the portable WAP to facilitate the location-based service comprises:
  forgoing by the WCD from transmitting the location of the portable WAP to the LBSP.

13. The method of claim 10, wherein avoiding by the WCD use of the stored location of the portable WAP to facilitate the location-based service comprises:
  transmitting to the LBSP an indication that the location is incorrect.

14. The method of claim 13, wherein transmitting to the LBSP the indication that the location is incorrect comprises including a statistical certainty measure of the indication that the location is incorrect.

15. The method of claim 10, wherein the stored location of the portable WAP is a first location of the portable WAP, and wherein avoiding by the WCD use of the stored location of the portable WAP to facilitate the location-based service comprises:
  outputting by the WCD, on a user interface, a prompt for user entry of a second location of the portable WAP;
  receiving by the WCD, in response to the prompt, the user entry of a current location of the portable WAP as the second location;
  storing by the WCD, in place of the first location of the portable WAP, the received second location of the portable WAP; and
  using by the WCD the received second location of the portable WAP, rather than the first location of the portable WAP, to facilitate the location-based service.

16. The method of claim 15,
  wherein the WCD transmits to a LBSP a request for the location-based service,
  wherein using the stored first location of the portable WAP to facilitate the location-based service comprises retrieving the stored first location and transmitting the first location to the LBSP to enable the LBSP to provide the requested location-based service based on the first location; and
  wherein using by the WCD the received second location of the portable WAP, rather than the first location of the portable WAP, to facilitate the location-based service comprises transmitting the second location to the LBSP to enable the LBSP to provide the requested location-based service based on the second location.

17. The method of claim 10, wherein the location-based service is emergency service.

18. A wireless communication device (WCD) configured to control implementation of a location-based service, the WCD comprising:
  a wireless-communication interface;
  data storage; and
  a controller,
  wherein the controller is configured to associate the WCD with a portable wireless access point (WAP) that provides wireless coverage in which to serve the WCD, and store in the data storage of the WCD a location of the portable WAP for use to facilitate a location-based service when the WCD is associated with the portable WAP,
  wherein the controller is further configured to cause the wireless-communication interface to detect that the WCD is within coverage of one or more particular cellular coverage areas while the WCD is associated with the portable WAP, and responsive to detecting that the WCD is within coverage of the one or more particular cellular coverage areas when the WCD is associated with the portable WAP, store in the data storage of the WCD a correlation between the portable WAP and the one or more particular cellular wireless coverage areas, and
  wherein the controller is further configured to thereafter again associate the WCD with the portable WAP, and when the WCD is so again associated with the portable WAP, the controller is configured to (i) use the wireless-communication interface to scan for the one or more particular cellular coverage areas, (ii) determine, based on the scanning, that the WCD is not within coverage of the one or more particular cellular coverage areas, and (iii) responsive to the determining, cause the WCD to avoid use of the stored location of the portable WAP to facilitate the location-based service.

19. The WCD of claim 18, wherein the stored location of the portable WAP is a first location of the portable WAP, and wherein causing the WCD to avoid use of the stored location of the portable WAP to facilitate the location-based service comprises:
  outputting by the WCD, on a user interface, a prompt for user entry of a second location of the portable WAP;

receiving by the WCD, in response to the prompt, the user entry of a current location of the portable WAP as the second location;

storing by the WCD, in place of the first location of the portable WAP, the received second location of the portable WAP; and using by the WCD the received second location of the portable WAP, rather than the first location of the portable WAP, to facilitate the location-based service.

20. The WCD of claim 18, wherein the location-based service is emergency service.

* * * * *